United States Patent
Reid

(10) Patent No.: US 7,478,327 B1
(45) Date of Patent: Jan. 13, 2009

(54) UNIFIED CAPTURE AND PROCESS INTERFACE

(75) Inventor: Glenn Reid, Woodside, CA (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 09/680,105

(22) Filed: Oct. 4, 2000

(51) Int. Cl.
*G06F 3/00* (2006.01)

(52) U.S. Cl. .................. 715/723; 715/719; 715/722

(58) Field of Classification Search .......... 345/723, 345/720, 629, 473, 769, 724; 715/719–726; 348/169, 333.05, 425.4, 584
See application file for complete search history.

(56) References Cited

U.S. PATENT DOCUMENTS

| | | | | |
|---|---|---|---|---|
| 5,146,548 A | * | 9/1992 | Bijnagte | 715/209 |
| 5,237,648 A | * | 8/1993 | Mills et al. | 345/723 |
| 5,404,316 A | * | 4/1995 | Klingler et al. | 345/723 |
| 5,459,832 A | * | 10/1995 | Wolf et al. | 345/769 |
| 5,659,793 A | * | 8/1997 | Escobar et al. | 345/629 |
| 5,664,087 A | * | 9/1997 | Tani et al. | 345/473 |
| 5,664,216 A | * | 9/1997 | Blumenau | 715/723 |
| 5,682,326 A | * | 10/1997 | Klingler et al. | 345/723 |
| 5,760,767 A | * | 6/1998 | Shore et al. | 345/723 |
| 5,786,814 A | * | 7/1998 | Moran et al. | 345/720 |
| 5,999,173 A | * | 12/1999 | Ubillos | 345/724 |
| 6,100,925 A | * | 8/2000 | Rosser et al. | 348/169 |
| 6,262,724 B1 | * | 7/2001 | Crow et al. | 345/723 |
| 6,628,303 B1 | * | 9/2003 | Foreman et al. | 715/723 |
| 6,724,918 B1 | * | 4/2004 | Yen et al. | 715/866 |
| 2002/0049979 A1 | * | 4/2002 | White et al. | 725/87 |

OTHER PUBLICATIONS

Darrel Plant, Flash 3! Creative Web Animation, 1998, Macromedia Press, 3rd Edition, whole book.*
Macromedia, Flash 4 Using Flash, Jun. 1999, Macromedia Inc. 1st Edition, whole book.*

* cited by examiner

*Primary Examiner*—Weilun Lo
*Assistant Examiner*—Truc T Chuong
(74) *Attorney, Agent, or Firm*—Blakely, Sokoloff, Taylor & Zafman LLP

(57) ABSTRACT

The method of collecting a time based stream of information to generate a presentation is provided for in which a processing system is employed. In one exemplary method, the processing system communicates with an information source that contains a time based stream of information. This communication may be through an automatic detection procedure that may trigger a capture mode and the gathering of the time based stream of information. A user interface may present controls for toggling between capture mode and edit mode within a single window of the user interface. A capture output, which is often a substantially true representation of the quality of information being acquired, may be provided on a portion of the display, e.g. viewing portion, during the capture mode. An edit output that represents the edited version of clips may be provided on the same viewing portion of the display during the edit mode. The use of an interrupt procedure allows for controls to be enabled during capture such that the user may perform various tasks while the system is loading the time based stream of information. Other aspect of the present invention relating to the processing system for collecting a time based stream of information for use in authoring a presentation are also described.

74 Claims, 8 Drawing Sheets

UNIFIED CAPTURE AND PROCESS INTERFACE

NOTICE OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to methods for manipulating a time based stream of information using a processing system, and more particularly to methods of capturing and editing a time based stream of information to create a presentation using a processing system.

BACKGROUND

There are many fields, such as entertainment, academics, business, health care, etc., that utilize media having time based streams of information. These time based streams of information may be in the form of full motion images, e.g. video and movies; audio, e.g. music, sound effects, and voice/narration; motion graphics, e.g. animation; still images, e.g. text, pictures; and combinations thereof. The information is usually comprised of a stream of individual units, e.g. frames or blocks. Frequently, this information is in a digital format and resides on any of a number of conventional electronic mediums.

Oftentimes, the time based information is assembled into a presentation through the use of a processing system to edit the information. For example, a video may be edited and combined with audio, text, effects and/or graphics to create a presentation. A "presentation" is any changed version of an original time based stream of information or a modified copy of the original information. In addition, a "presentation" also may further be defined by at least one instruction for representing the original information in a changed form. In such an instruction-based presentation, the information is communicated in the manner according to the instruction. For example, a software program may include directions on how a digital video should be played, for instance, where only certain frames of a video are chosen for display.

Digital editing is typically performed in a processing system and involves random retrieval of information from storage, communication of the information, e.g. display on a monitor, and then manipulation of the information to produce the desired presentation. Various types of editing may be performed as new techniques for altering raw information are created. A portion or portions of sequential information, also referred to as a "clip," such as a continuum of segments, frame, block or footage, may be rearranged into a desired order. Typically, the presentation appears as a seamless flow of the edited information. Editing may further entail removing portions of clips. During editing, particular "edit features" may be added to the presentation, such as transitions between clips, special effects (e.g. black and white, brightness, contrast, texture, echoes, compositing, blurring, etc.), text, graphics, clack background, silent audio segments, combinations of different types of time based streams of information, such as audio and still images, and the like. Various types of editing may be performed as new techniques for altering raw information are created.

Traditionally, editing of multimedia to produce presentations involved complex techniques performed by trained professionals. However, recently novice users have become interested in making presentations, as well. There has been increasing popularity in the processing of multimedia to produce sophisticated home movies, web sites, etc.

Given the currently diverse level of skills among authors of presentations, it is desirable to provide processing a system that are easy and convenient to operate. Such system should require less hands-on activity of the user and have a simple user interface display.

Although previous authoring systems provide for varying levels of ease for the novice user, there are still several drawbacks to these systems. Some prior systems include Studio DV from Pinnacle Systems Inc. of Santa Clara, Calif.; Avid Cinema® from Avid Technology, Inc. of Tewksbury, Mass.; Adobe Premier® from Adobe of San Jose, Calif.; Dazzle* Digital Video Creator™ from Dazzle Multimedia of Fremont, Calif.; and DVgate™ from Sony Corporation of Tokyo, Japan.

In general, processing systems require that the time based stream of information be captured from a media source and entered into the system. The system must be able to receive information as quickly as it is being transferred from the source so as to not lose any portion of the information. The usual speed for loading video information into the system is about 3.5 Mbytes per second. The length of the video may vary, depending in part on the amount of storage space available in the system.

In order to avoid missing the capture of any segments of information, earlier systems require that all other applications be suspended during the loading process. Furthermore, these prior systems usually disable all controls, such as keyboard commands, mouse commands and on-screen commands, while the system is in capture mode, and prepared for acquiring a time based stream of information. As a result, a user may not perform other tasks while information is being acquired. In fact, for some systems, the selection of a control by the user during this period disrupts the entire capture process. The user may stop capture in these prior systems by hitting any button on a keyboard, selecting an option on the display, clicking on a mouse, etc. Thus, the user must remain idle until after the information is obtained. During capture, the user cannot select from various controls or work with other applications on the system. As a result, much time is wasted during the capture process with these prior systems, and especially where a good deal of time is required to deposit large amounts of information.

Some previous processing systems do permit display or output of the transferred information during the capture process for viewing or listening. However, the output by these systems is of low quality. Instead of devoting the system to generating high quality output, the system dedicates much of its resources to the reading and writing of information entering the system to avoid loss of information. For example, typical prior systems display at a rate of about 3 frames per second during video capture. However, the rate for video to transfer into a system is often 24 to 30 frames per second. As a result, the display during the capture process is a poor representation of the quality of the information that is actually being captured. The user is not able to tell the true quality of information entering the system until after the information is stored.

Moreover, prior systems generally have complicated user interfaces for capture and edit of the time based stream of information. The systems require separate display screens for the various modes of operation, such as acquiring of information and editing of the information. In order to read and write the information into the system, the user must select a capture mode, whereupon the system displays a capture screen and the tools necessary for acquiring information. Thereafter, the user switches to an edit mode for display of an edit screen having controls for manipulating the information. This toggling between multiple screens for edit and capture complicates the process and wastes screen real estate.

In light of the shortcomings of the various currently available systems, there is still a need for creating a presentation of a time based stream of information in a manner that is quick and easy to perform. In particular, there is a desire for a processing system that has a simple user interface that provides efficient use of screen real estate by providing a single screen that is functional for both capture and edit. The output of information being captured within the system should also substantially reflect the quality of the incoming information. Furthermore, there is a need for a system that permits a user to perform multiple tasks at once, such as run capture routines simultaneous with other applications. The system should reduce the need for hands-on by the user, such as the necessity for manually directing various operations.

SUMMARY OF THE INVENTION

In one embodiment of the present invention, a method for collecting a time based stream of information in a processing system for generating a presentation is provided. The method includes communicating with a time based stream of information source, presenting capture information from the time based stream of information on a first portion of a display, and process information for constructing the presentation on a second portion of the display. At least one enabled control element is also presented for editing the information, performing side operations, and directing other tasks of the processing system. An output control may also be presented for controlling the display of the time based stream of information.

The method may further include capturing the time based stream of information from the information source. The system may present capture information automatically in response to communicating with the information source. The capture information may include a capture output that is provided on the display at the same rate or substantially the same rate as the transfer rate for the time based stream of information. In some cases, the capture is by the execution of an interrupt procedure. Often, such an interrupt procedure iterates at the same or substantially the same rate as the transfer rate of the time based stream of information. Furthermore, an edit output may be provided on the same portion of the display that the capture output is presented.

In another embodiment of a method for collecting the time based stream of information, the system detects an information source that in communication with the processing system. Automatically, in response to detecting the source, capture information from the time based stream of information is provided on a display. At times, the processing system may perform automatic checks for the time based stream of information source in communication with the processing system. The detection is by receiving a signal from the information source having a time based stream of information, through a capture port on the processing system. The system may capture the time based stream of information and further display capture output at the same rate or substantially the same rate as the transfer rate for the time based stream of information.

Another embodiment of a method for generating a presentation of a time based stream of information includes capture of the time based stream of information during a capture mode and presenting a capture output on a viewing portion of a display. Furthermore, during an edit mode, an edit output is presented on the viewing portion of the display. A capture output may be provided at the same rate or substantially the same rate as the transfer rate for the time based stream of information. In some cases, at least one enabled control element is also provided on the display during the capture mode and edit mode. Such enabled control element may be for performing side operations.

In order to generate the presentation of a time based stream of information, a processing system may be employed which has a capture port for acquiring the time based stream of information, a storage medium, a display device and a processor. The processor is for communicating with an information source through the capture port. The processor is further configured to present capture information on a first portion of the display device, process information on a second portion of the display device and at least one enabled control element, e.g. for editing or performing side operations. Usually, the processor is also used for capturing the time based stream of information from the information source, such as through execution of an interrupt procedure that may iterate at the same or substantially the same rate as the transfer rate of the time based stream of information. The processor may further assist in presenting a capture output at the same or substantially the same rate as the transfer rate for the time based stream of information. In some embodiments, the processor may be for automatically presenting capture information in response to communication with the information source.

According to still further embodiments, a computer readable medium may be provided that has stored therein a plurality of sequences of instructions, which, when executed by a processing system, cause the processor to perform a variety of processes to related to collection the time based stream of information and generation of a presentation. The instructions command the processor to communicate with a time based stream of information source, provide capture information on a first portion of a display, process information for constructing the presentation on a second portion of the display, and at least one enabled control element. Additional sequences of instructions may cause the processor to capture the time based stream of information or provide an edit output on the first portion of the display after the presenting of capture information. Of course, other embodiments may provide only the instructions themselves or methods of performing these steps.

The processing system may also have a means for communicating with an information source having a time based stream of information, means for presenting capture information from the time based stream of information on a first portion of the display device, means for presenting process information for constructing the presentation on a second portion of the display device, and means for presenting at least one enabled control element.

The benefits of collecting a time based stream of information by the processing system are direct in that efficient use of screen real estate are presenting by a single screen that is functional for both capture and edit, as well as other side operations, i.e. multitasking, during the capture process. By using the present system, especially through the interrupt procedure, multiple tasks may be performed virtually simultaneous with the capture process. Moreover, the system has the ability to present a close to accurate representation of the information being acquired without compromising the capture process.

Other features and advantages of these and other embodiments are discussed in detail below.

BRIEF DESCRIPTION OF THE DRAWINGS

The present invention is illustrated by way of example, and not limitation, in the figures of the accompanying drawings in which:

FIGS. 4A-4B are flow diagrams of methods of reading and writing a time based stream of information into a processing system, wherein FIG. 4A shows a prior art process to capture the information and FIG. 4B shows a process to capture the information and perform other routines in accordance with the present methods.

FIGS. 5A-5C are examples of user interfaces for displaying both capture information and process information, according to one embodiment of the present invention, wherein FIG. 5A is a GUI showing a representation of an acquired time based stream of information, FIG. 5B is a GUI showing controls for editing text into a presentation and FIG. 5C is a GUI showing controls for editing transitions into a presentation.

DETAILED DESCRIPTION

The processing system described below is an authoring tool that is configured to provide simple and convenient acquisition and editing of a time based stream of information in the system creating a presentation. One embodiment of the system incorporates a feature for automatically sensing an information source having a time based stream of information and for activating a capture mode. Another configuration of the system includes a single user interface that is functional for both a capture mode of operation and an edit mode of operation. The system may provide for high quality output of information being acquired.

In still another embodiment, the user interface includes enabled controls so that various tasks may be performed while the information is being imported into the system. Although the system performs only one computer instruction at a time, it may multitask by alternating the programs or sets of instructions it performs. During capture of the time based stream of information, the system simply takes turns managing the programs that the user effectively starts. The system operates at speeds that make it seem as though the user's tasks are being performed simultaneous with information capture and without the system losing any of the received information. The ability of the system to permit a user to perform various procedures while capturing can save the user time.

The time based stream of information and related presentation created by use of the processing system may be of any form, such as full motion images with audio, full images without audio, audio only, still images, motion graphics, e.g. a succession of photos or graphics, or any combination thereof.

Hardware Overview

Figure 1:
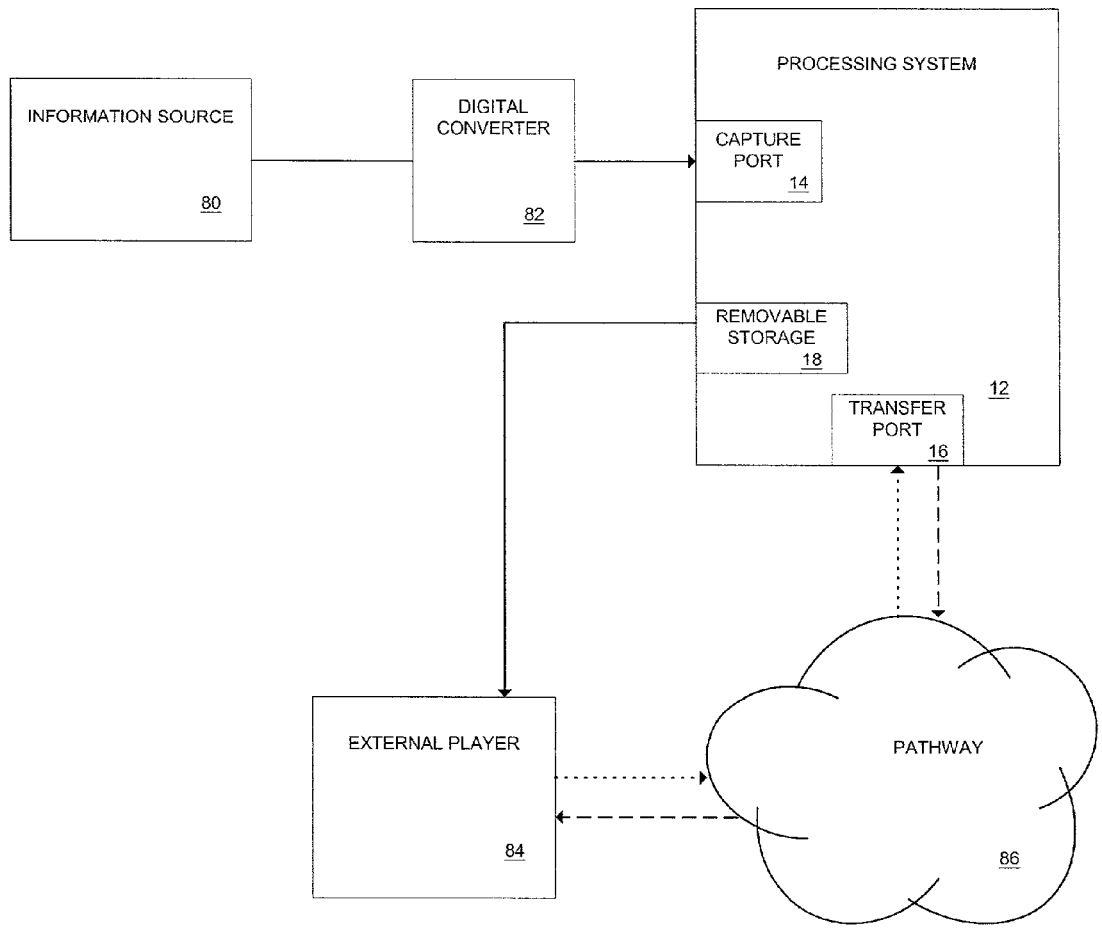
FIG. 1 illustrates one embodiment of an authoring environment in which a time based stream of information may be processed, in accordance with the teachings presented herein.

FIG. 1 illustrates an exemplary authoring environment 10 in which a time based stream of information may be processed to produce a presentation. A processing system 12, according to one embodiment of the present invention, is in communication with an information source 80 that has a time based stream of information at a capture port 14 (i.e. information collection interface) and optionally through an intermediate digital converter 82. Processing system 12 may read, copy, manipulate, store, delete, output, print and/or transfer information provided by source 80. An optional external player 84 receives communication from processing system 12, either indirectly from a transfer port 16 and through pathway 86, and/or directly through a removable storage medium 18. Although FIG. 1 demonstrates one layout of authoring environment 10, the scope of the present invention anticipates any number of information sources and players, coupled and arranged in various fashions and configured in accordance herewith.

The information source 80 is any type of device that generates and transfers data or data signals related to the time based stream of information. The information source 80 may be a photographic or full motion image capture interface such as a camera, camcorder, digital camera, etc.; a sound capture interface, such as a laser disc player (e.g. CD player), tape player/recorder, MP3 player, microphone, etc.; a keyboard; a scanner; a computer; a server; a computer program; the Internet, a sensor; any one of numerous available data collection devices; etc.

The information source may generate digital data signals and be communicatively coupled directly to the processing system 12. Alternatively, the information source may generate signals in a format other than digital, e.g. analog signals. As shown in FIG. 1, such non-digital data source may send signals to a digital converter 82 for changing the signals into a digital format prior to transfer of the data to the processing system 12. In another configuration, the information source 80 resides in the processing system, such as a software file having data that is imported to an editing application program employed by the present invention. For example, a graphic image may be designed from scratch using a graphics program and may be imported to the editing application for use in the presentation.

Communication between the information source 80 and the processing system 12 is often through means of a FireWire® (from Apple Computer, Inc. of Cupertino, Calif.), iLink or IEEE 1394 communication protocol. Where a FireWire brand protocol is employed, capture port 14 in the processing system may be a six-pin FireWire brand port. Also, a corresponding four-pin FireWire brand port may be present on the digital converter 82, where a digital converter is included, and/or on the information source 80. In this case, a six-pin-to-four-pin cable may be used to connect the ports of the digital converter 82 or information source 80 and processing system 12.

Other communication schemes are also suitable for transfer of data from information source 80 and/or digital converter 82 to the processing system 12, such as an Ethernet connection (i.e., capture port 14 may be an Ethernet port), serial interfaces, parallel interfaces, RS422 and/or RS432 interfaces, Livewire interfaces, Appletalk busses, small computer system interfaces (SCSI), ATM busses and/or networks, token ring and/or other local area networks, universal serial buses (USB), PCI buses and wireless (e.g., infrared) connections, Internet connections, and other communication links for conveying the time based stream of information from an information source 80 to the processing system 12. In addition, source 80 may store the information on a removable storage source, which is coupled to, e.g. inserted into, the processing system 12 and in communication with the capture port 14. For example, the source 80 may be a tape, CD, hard drive, disc or other removable storage medium.

Processing system 12 is any device configured to receive the time based information and manipulate the information to generate a presentation, e.g. a computer system or workstation. In one embodiment, the processing system 12 includes a platform 20, e.g. a personal computer (PC), such as a Macintosh® (from Apple Computer, Inc. of Cupertino, Calif.), Windows®-based PC (from Microsoft Corporation of Redmond, Wash.), or one of a wide variety of hardware platforms that runs the UNIX operating system or other operating systems. Often, the processing system 12 is configured to send the resulting presentation to an external player 84.

The external player 84 may be an IP host, a computer, a personal digital assistance (PDA), a server, a tape/CD/MP3 player, or other device that is configured to receive presentation information from processing system 12 and to display the presentation. In one instance of an authoring environment, the external player 84 is the same device as the information source 80, such as a camcorder. In still another case, no external player is provided and the presentation is played on the processing system and/or projected from the processing system onto a medium, e.g. a screen.

The external player 84 may receive information directly through removable storage 18 from the processing system 12. Removable storage 18 represents any of a number of detachable storage mediums, e.g. magnetic, optical, magneto-optical, tape, and/or other type of machine-readable medium or device for storing information. For example, the removable storage 18 may be a hard disk, a read-only or writeable optical CD (e.g. CD ROM, DVD), a disc, tape, etc.

External player 84 may also receive presentation information indirectly from the processing system 12, such as through a pathway 86. The communication pathway 86 may be through various networking mechanisms, such as a FireWire brand connection (or iLink or IEEE 1394 type of connection), LAN, WAN, telephone line, serial line Internet protocol (SLIP), point-to-point protocol (PPP), an XDSL link, a satellite or other wireless link, a cable modem, ATM network connection, an ISDN line, a DSL line, Ethernet, or other communication link between the processing system and external player.

Figure 2:
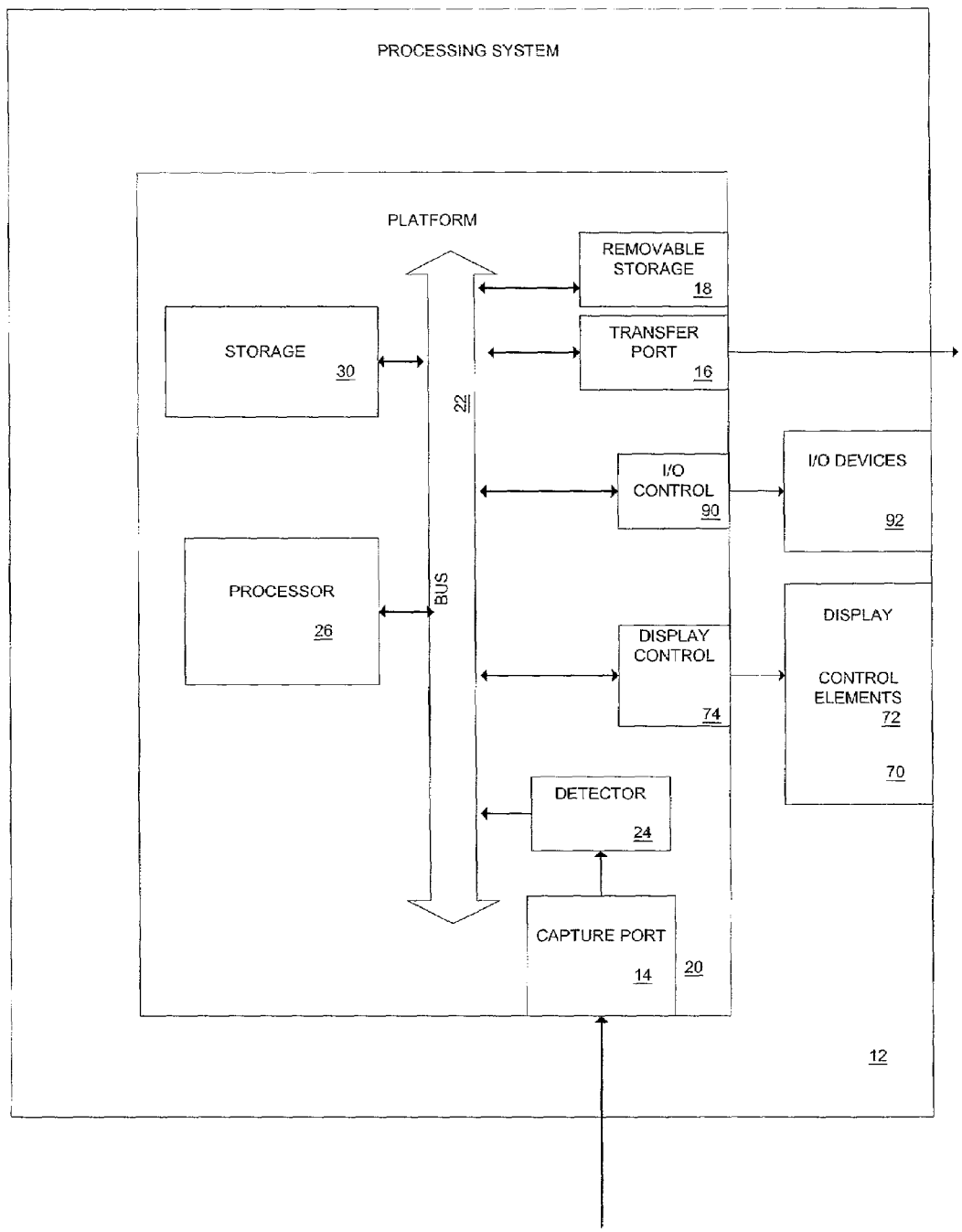
FIG. 2 is a block diagram of one embodiment of a processing system, configured in accordance with the teachings presented herein.

The processing system has components for handling time based information in various ways. As shown in FIG. 2, these components include an optional detector 24 for sensing communication with the information source 80 through capture port 14, a display 70 for showing a user interface and the time based stream of information, storage 30 for holding the information, processor 26 for manipulating the information and possibly a transfer port 16 or removable storage 18 for sending the information so processed. Upon review of this specification, it will be appreciated by those skilled in the art that the components of processing system 12 may be connected in various ways in addition to those described herein.

Now referring in more detail to the components shown in FIG. 2, processing system 12 includes processor 26, which may represent one or more processors. Some exemplary processors are a Motorola Power PC processor, an Intel Pentium (or x86) processor, etc. The processor 26 may also be a microprocessor. The processor 26 runs an operating system and applications software that controls the operation of other system components. The processor may be configured to perform multitasking of several processes at the same time.

Storage 30 is coupled to processor 26 by a bus 22. The storage 30 may be a dynamic random access memory (DRAM) and/or may include static RAM (SRAM). Typically the storage is a hard disk drive, but may alternatively be another magnetic disk, a magneto-optical disk or other read/write device. The processor may also be coupled to other types of multiple storage areas that may be considered as part of the storage 30 or separate from the storage 30. Some alternative storage areas may include cache, flash memory, etc., and which may also be considered the removable storage 18. Usually storage 30 has a capacity in the megabyte to gigabyte range, and more typically, at least 2 gigabytes capacity and can sustain throughput of at least 3.5 megabytes per second of information. However, as technology advances, the capacity of the storage may increase.

The storage 30 contains the acquired time based stream of information within files as well as executable code that provides functionality for processing the time based stream of information in accordance with the present invention. The time based stream of information is stored within files in an information storage area 50. The storage may also include separate other storage areas for storing various presentation related information, such as references to clips and the modified presentation.

Bus 22 further couples the processor 24 to an input/output (I/O) control 90, a transfer port 16 and/or removable storage 18. The I/O control 90 commands one or multiple I/O device (s) 92. Some conventional I/O devices are key boards, mouses/trackballs or other pointing devices, microphones, speakers, magnetic disk drives, optical disk drives, printers, scanners, digital cameras, etc.

In one configuration of processing system, a means for communicating with an information source that has a time based stream of information is provided. For example, bus 22 additionally couples detector 24 to the processor 26. The processing system may detect a connection between the processing system and the information source through detector 24.

The detector 24 may perform an inquiry as to whether an information source is in communication with the processing system. Typically, the detector determines a connection with the information source by sensing particular signals, such as electrical current output, that are released from the information source, and usually when the source is energized, i.e. "turned-on." Such signals may be in various forms such as digital or analog. The detector informs the operating system of the presence of a source. The detector system may be further configured to conduct periodic checks for communication with the information source, where an inquiry is sent to the operating system as to whether communication with a source has been found. This polling for a source may take place at any predetermined intervals, e.g. every one-half second.

Figure 3:
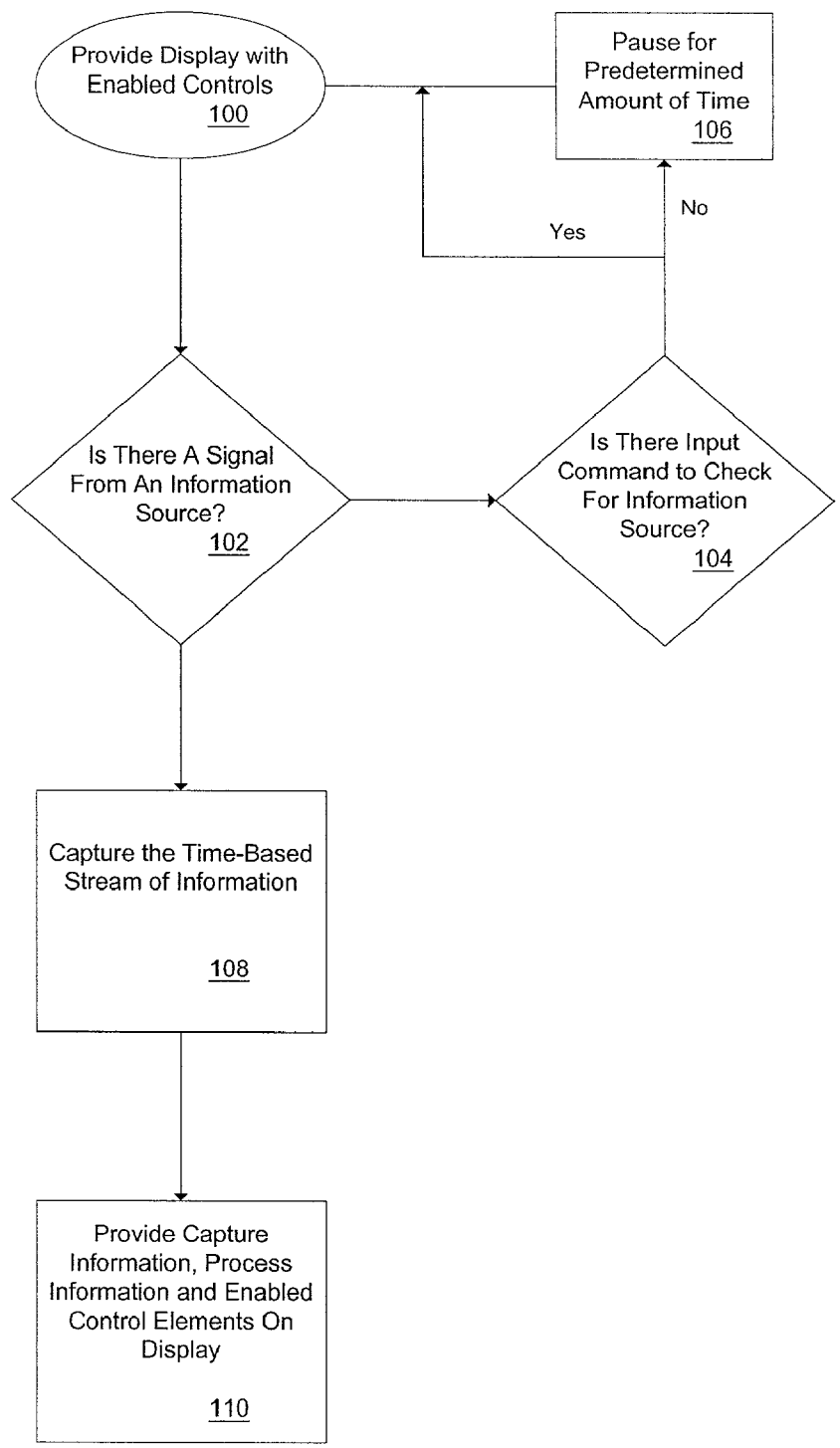
FIG. 3 illustrates a flow chart, which shows a method for communicating with an information source, in accordance with the present processes.

FIG. 3 is a flowchart that illustrates one method of the processing system detecting an information source. The system initially provides a display with enabled controls 100. Prior to communication with the information source, the system is usually configured for the edit mode. The detector checks if there is a signal from the information source 102. If such signal is not sensed, the detector informs the operating system. The processing system then queries the operating system if it has noticed an information source. Where a source had not been detected, the processing system pauses for a predetermined time 106 before checking for the information source again. However, if at any time, the detector processing system receives an input check command 104, such as from the user, the detector processing system will check for the information source without waiting through the pause period. Once a node, i.e. the information source, is added to capture port 14 and the node is detected, the system ceases to perform the routine inspections for the information source and connection with the information source for receiving information is opened.

The detector 24 may provide for automatic detection where the detector senses the coupling of the system with the information source and automatically engages a capture mode. This automatic detection may be activated from an editing window. This editing window has controls for manipulating the time based stream of information. While still showing the editing window, the detector instructs the processor 26 to automatically switch to a capture mode of operation and execute a software routine for capturing the information. During the capture mode the processing system is prepared to read, store and display the time based information. The system begins capturing the stream of information 108 which may be monitored in the editing window. Various capture information, process information and enabled controls are provided on the system display 70. Furthermore, toggle controls may be presented to permit a user to switch between edit mode and capture mode, usually within the same window, e.g. editing window.

In one example, the communication between the system and with the information source or digital converter is through means of a FireWire brand protocol and the detector 24 receives the FireWire type of signals that have been transmitted from the information source through the FireWire brand cables. The FireWire brand protocol is capable of providing sequential frames of the time based stream of information. The detector indicates to the processor that communication with an information source exists and the processor prepares the system for reading and writing of the time based information. The detector further senses when the information source is no longer in communication with the processing system by the detector failing to receive the source signal.

In one embodiment, the processing system remains in an edit mode during loading of the time based stream of information. Thus, the edit and capture modes simultaneously run.

However, the system may also be manually switched between capture and edit modes. The user may toggle between modes of operation by activating either a capture mode control and edit mode control on the display. Where a user attempts to capture information and no information source is in communication with the system as detected by the detector, the user may be informed that a source is not present.

Further to the details of platform 20 in FIG. 2, a display control 74 is coupled to the processor 24 also through bus 22. The display control 74 communicates with the display 70 in the processing system 12 to couple the display 70 to the platform 20. Display 70 may be any one of a number of conventional display devices such as a liquid crystal display, cathode ray tube, plasma display, video display, or other type of display device. For sharp colors and grayscale, display 70 may be an SVGA monitor, with a resolution of 800×600 (26 dpi) or better, with an active area of at least 15 inches, and may be controlled using a true color video card.

The present invention additionally involves at least one and usually a plurality of control elements 72, e.g. objects, that may be visible on the display or invisible. An enabled control element may be used to control the capture process and/or edit process, and optionally to perform side operations that are related or unrelated to the generation of a presentation. Control elements that are associated with the capture or edit processes allow a user to manipulate and design a presentation or otherwise control it.

The processing system may contain any number of different types of control elements. A control element may be activated by the user or by other means to create control commands, where the control element responds by sending instructions to the processor. For example, a processing control element conveys directions to the processor regarding how a clip is to be treated or displayed. Each control element includes properties that describe how it will react when selected by the user or other means. Control elements that are used for side operations instruct the processor to execute applications or tasks other than capture and edit functions, e.g. during multitasking. For example, a control element may send instructions to the processor to execute network services, such as e-mail applications and, web browsers. Other side operations may be word-processing programs, spreadsheet programs, detection or communication with external devices/media (such as recognition of a CD ROM), etc In the present invention, the control elements may be either enabled or disabled during capture. However, in prior processing systems, control elements are disabled during the capture process. These previous systems employ sequential routines, commonly used by those skilled in the art, for capturing, processing of control commands and operating other applications.

Figure 4A:
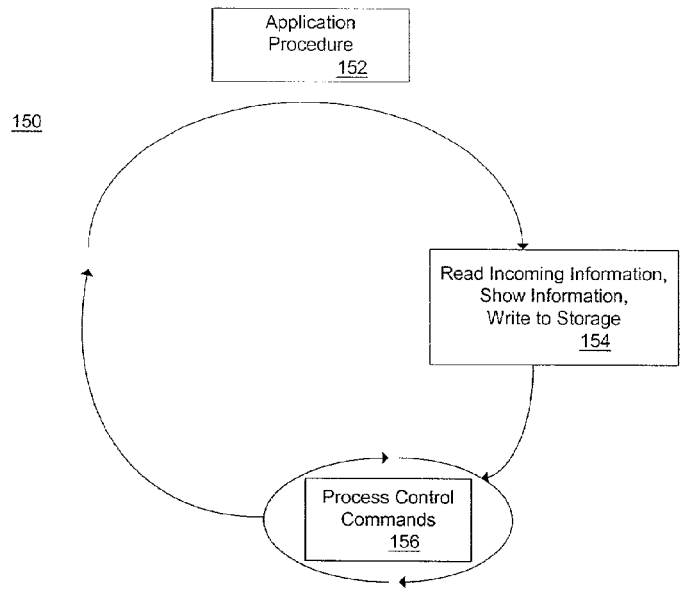

Means are provided for capturing the time based stream of information from the information source. FIG. 4A shows a prior sequential-type method 150 for capturing time based information in which an application procedure 152 is executed when the processing system is in capture mode. In one stage of the application procedure 152, signals from an information source is captured 154. The system reads the information, shows the information on the display and writes the information to a storage medium. However, when control elements are activated, the system moves away from the capture step and switches to another stage that includes a process control commands loop 156 for handling the control instructions. The CPU of a system employing such a sequential-type method is dedicated to processing the control commands. While application procedure 102 is in the process control command loop 156, the capturing operation ceases and the processing system stops communicating with the information source. During this period, the information that is released from the information source does not get loaded into the system. Rather, the processing of control commands continues through to completion, at which time, the capturing step 154 may continue. Thus, capture of information and other applications cannot be simultaneously executed with these sequential-based systems. In order to acquire the information and avoid processing of control commands, the system must disable the control elements.

By comparison to prior capture techniques, a low-level interrupt-type method, according to the present invention, effectively permits intermittent processing of control element commands while, at the same time, loading the time based information. With the interrupt-type method, in addition to the capture application, a user may run any software applications, e.g. network communication protocols, such as Appletalk, Internet or e-mail applications, word processing applications, etc.

Figure 4B:
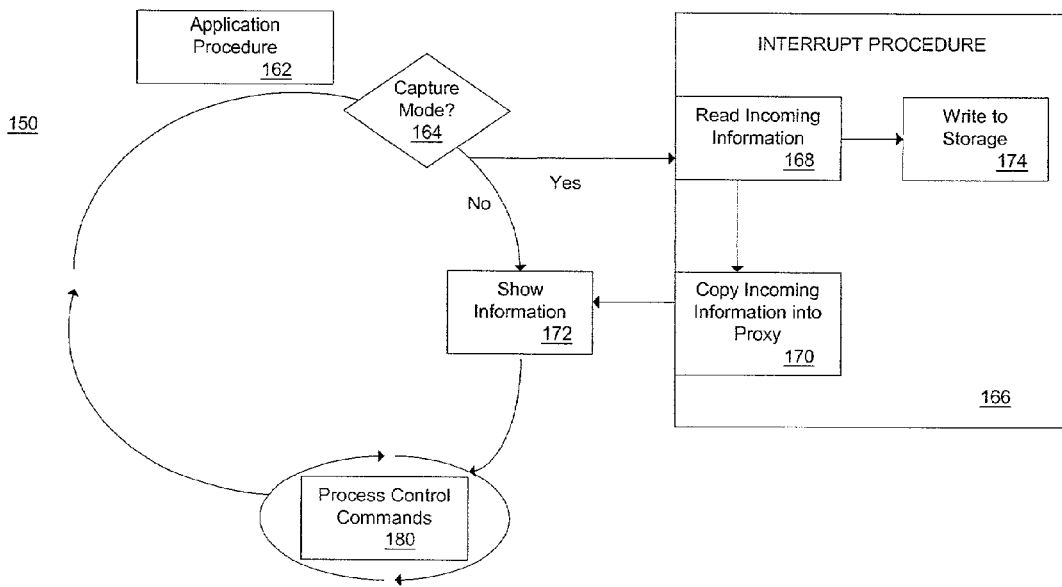

According to one embodiment of the present invention, as shown in FIG. 4B, interrupt-type method 160 includes an application procedure 162 that may be executed when the processing system is in capture mode 164 and when it is not in capture mode, e.g. when the system is in edit mode. Where the processing system is operating in a non-capture mode, the application procedure conducts normal operations, such as processing of control commands 180 from control elements. However, when the capture mode is indicated and the system is capturing the stream(s) of information, the interrupt procedure 166 fires the appropriate capture tasks and causes a temporary suspension of the application procedure 162 in an asynchronous manner. Thus, the processing of control commands proceeds until the capture process interrupts the other application tasks.

This interrupt procedure 166 is performed at periodic intervals as a separate procedure from the application procedure 162. The capture steps of the interrupt procedure are certain to iterate at regular times, despite the activities, e.g. processing of control commands, of the application procedure.

The interrupt procedure 166 includes a quick reading of incoming information 168, e.g. the current frame of the time based stream of information that is being received from the information source. This current frame may be copied into a proxy 170. The current frame from the proxy may be shown 172 on the display in a step that may or may not be outside of the interrupt procedure 166. In a slower step of the interrupt procedure, the information is written to storage 174. The information written into storage may be viewed and further edited by use of the control elements.

The essential capture steps are included in the interrupt procedure because these instructions are ensured to be carried out. The interrupt procedure is performed at its regularly scheduled intervals despite any other activity of the application procedure, e.g. showing of information. For example, writing to storage is vital to the capture process and, therefore, are included in interrupt procedure. Optional steps, on the other hand, may or may not be included in the interrupt procedure, but may be performed by the applications procedure instead. For example, the showing of capture information to the user may be excluded from the interrupt procedure. The operations of the application procedure are not certain to be performed. For example, where the user selects a control element, the application procedure may skip from showing the captured information to the processing control command loop. However, when the next iteration of interrupt procedure is to occur, the steps in the application procedure are overridden by the interrupt procedure. In-between iterations, the application procedure continues with its tasks, e.g. showing of capture information or processing of control commands.

Usually, the processing system according to the present invention, outputs the information, e.g. depicts the information on the display, at a rate (the "output rate") that is substantially similar to the rate in which each unit of the information, e.g. frame of video, is arriving from the information source (the "transfer rate"). In contrast with prior systems, where low quality displaying (i.e. considerably lower than the transfer rate, such as 30 to 70% of the transfer rate) is used to devote more of the system to capture, the present invention may use high quality (i.e. the same or substantially similar to the transfer rate, such as greater than 70% and more usually 93 to 100% of the transfer rate) because all of the information is certain to be stored by the interrupt procedure. The speed at which the information is displayed depends on numerous factors, such as side operations being simultaneously performed by the system, e.g. network access and CD ROM detection; image quality, e.g. based on decompression schemes employed; and processor speed or graphic acceleration. For example, where the transfer rate is about 30 frames per second (fps), the corresponding output rate of the present invention is usually 29 to 30 fps. The transfer rate depends on the particular transfer rate standard employed, as described in detail below. The resulting capture output is of high quality that is similar to the quality of the information residing in the information source.

The interrupt procedure is advantageous in that the process is very quickly performed and rapidly repeats. The time for performance is less than the transfer rate of the information entering the system.

The repetitions of the interrupt procedure occur at a rate that is substantially similar to or the same as the transfer rate. Thus, all of the information may be read and stored while still processing control commands in between each of the iterations of the interrupt procedure. As a result, the user does not recognize the interruptions and the capture process as well as other instructions appear to be simultaneously executed by the system. Moreover, the interrupt procedure guarantees that information is not omitted from the reading step because the iterations of the interrupt procedure and length of time to perform are timed to correspond with the rate of information transfer from the information source.

The transfer rate of the information entering the system is usually the same or substantially the same speed that the information runs prior to entering the system, such as the rates established by the video standards of various regions. For example, movie film usually runs with a speed of 24 fps. Some video follows the NTSC (standard used in North America and Japan), where the video speed is 29.97 to 30 fps. Hence for transfer of NTSC video, the interrupt procedure iterations are typically at least every $\frac{1}{29}$ to $\frac{1}{30}$ second and more usually $\frac{1}{29.97}$ second to $\frac{1}{30}$ second. For PAL systems (standard used in parts of Europe, China and Hong Kong), the frame rate is 25 fps and thus interrupt procedure is substantially at least every $\frac{1}{25}$ second. Other standards may be employed, such as SECAM.

In any case, the interrupt procedure usually should iterates at the transfer rate, close to the transfer rate or slightly faster than the transfer rate, e.g. within at least $\frac{1}{10}$th second of the transfer rate and more typically within $\frac{1}{100}$th second. The iterations should not be slower than the transfer rate and the iterations are usually at the rate that corresponds to the frame rate of video standard.

During the capture process, the time based stream of information is written into storage to be referenced while creating the presentation. For convenience, the stored information may be compressed to conserve storage space. Generally, compression formats are either high efficiency or low efficiency and either loss-less or lossy. Lossy compression schemes are characterized by components of an original image being absent from a reconstructed image after a compression-decompression cycle, whereas loss-less schemes do not drop any information.

Low compression schemes (i.e., those that do not provide significant compression ratios) that may be used include joint photographic experts group (JPEG) compression schemes that use Fourier analysis-based methods, such as the discrete cosine transform, to compress data; graphics interchange format (GIF) compression schemes, which use LZW algorithms; bitmapped image compression schemes and tagged image file format (TIFF) compression schemes, etc. Alternatively, high efficiency compression schemes, such as wavelet, motion wavelet, Motion Picture Experts Group (MPEG) motion JPEG, Lempel Ziv and/or fractal compression schemes, etc., may be employed. Use of high efficiency schemes may be preferred where storage space is limited. For example, wavelet compression schemes may be 20 times more efficient than JPEG compression schemes, providing for a more detailed representation of the data at the same bit budget. Once the time based information is captured and stored, it may be referenced for editing and generating a presentation.

The stored information is often outputted as, process information. Output may be through various mechanisms, such as depiction on the display or play through speakers Means for presenting the capture information, process information and control elements are provided.

Figure 5A:
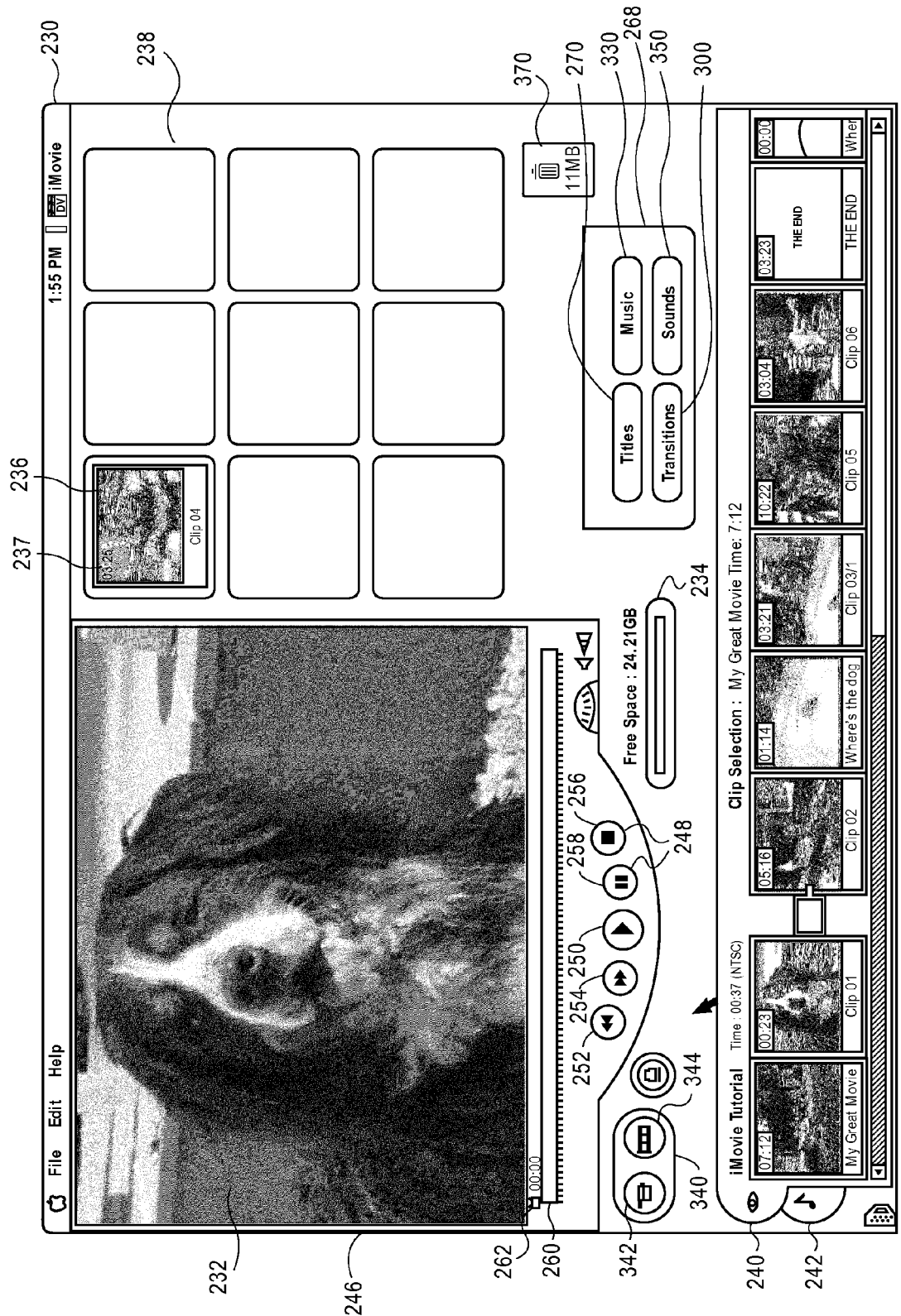

FIG. 5A, depicts an exemplary graphical user interface (GUI) 230 for displaying both capture information and process information on the display 50.

Capture information is related to the time based information being acquired by the system while in capture mode. The capture information may include a depiction or replay of the time based stream of information (referred to as a "capture output") 232, as well as other characteristics of the information that is being acquired. The capture output sets forth the current frames that are being received and read, such as newly acquired information that is present in a proxy, i.e. buffer, prior to being written into storage. A time code 237 may be provided as capture information that indicates the length of a clip. In addition, the capture information may include an audio synch time line 242 (depicted under video time line 140) on which references to clips 236 (as described below) are arranged and depicted in size according to the length of the clip in storage. A user may opt for the audio synch time line to automatically display the references for each incoming stream of information. For example, the user may choose a preferences control from a menu and select to have the references appear in the audio synch time line rather than the shelf portion of the user interface. The capture information may further include a free space monitor 234 to show the amount of storage space remaining or amount of space consumed by stored information. Capture information may also include tools, e.g. control elements, for controlling the capture process.

The process information that is displayed on the GUI 230 may include an edit output to reveal stored clips of the time based information for processing/editing during an edit mode. The edit output depicts how the clips could appear in presentation after editing is complete. For example, the user may desire to modify a clip, such as add a title or transition to a clip. The user may observe the edit output of the clip with the selected title or transition and the user may choose to accept or reject the modification as part of the presentation.

The process information may also include at least one object reference 236, e.g. icon, with each reference 236 being associated with a clip of the time based information contained in storage 30. Typically, the reference 236 is displayed as a "thumbnail" in the form of a still image of the first frame of the associated clip. The reference may be provided on a shelf 238 portion of the GUI 230. The number of references that may be displayed on the shelf depends, inter alia, on the resolution of the display, e.g. 9 to 12 references. By selecting the associated reference and employing other process information, individual clips may be edited.

Other process information displayed on the GUI 230 may also include at least one control element for the user to manipulate the time based information and construct a presentation, at least one time line that represents the edited presentation, such as video time line 240 and audio time line 242, and other elements that add convenience to the edit process.

The present invention frequently has a single GUI to display both capture information and process information. Such a GUI is functional for both capture and edit procedures, thus avoiding the necessity of switching to multiple GUI's to view and work with information relating to capture and information relating to the processing of the presentation. Any convenient portions of the screen may be used to show the capture and process information without the user needing to toggle between screens. The GUI may include toggle controls 340 to switch between modes of operation, usually within the same window. When capture made control 342 is activated, the system is prepared to capture information and when edit mode control 342 is triggered, the system is ready for editing of the information.

In one embodiment, the same portion of the display may be used to show capture information and process information at different times. In one such embodiment, a capture output may be presented on a viewing portion of the display during capture of the time based information and an edit output may be presented on the same viewing portion during editing of the presentation. In the alternative, a portion of the display provides capture information, such as the capture output, and another portion of the display contains process information. An example of this embodiment is where capture information is shown in a window on the display, and process information in at least one other window on the display.

Typically, one or more windows are present in the GUI, which may be opened by processor 24 or by the user. One such user interface illustrated in FIG. 5A has a monitor window 246. During the capture mode, the monitor window 246 may exhibit the capture output of the time based information. This monitor window may be the viewing portion of the display that shows the capture output and edit output.

In addition to showing the capture output, the monitor window 246 may depict the edit output. Usually within the same window, the capture output is shown while the information is acquired and the edit output is shown while editing the presentation. By this dual use of the monitor window, the screen area is conserved and the user interface is simplified. Various other windows may be present on the display of the processing system to provide at least one control element.

The use of a single GUI to display functional, i.e. enabled, control elements for capture, processing, and side operations, is especially useful while the system is capturing the time based information from the information source of information. Such enabled control elements permit a user to perform various operations while the processing system is capturing the time based stream of information.

One set of control elements are output controls 248 that implement how the user chooses to view or listen to the information from the system. Output control elements may direct the showing of the information on the monitor window 246, the playing of information through audio speakers, or output through other convenient devices in communication with the system. There are several types of output controls 248 that may be provided by the processing system.

The output controls 248 may be used to move the play-head (i.e. pointer to indicate the location in the information available for use) to particular sections of the information stored in the storage. One such output control is a play control 250 that directs the system to play or show the information. Other kinds of output controls include a rewind control 252 and a forward control 254. The play-head may be jogged backward by the user depressing the rewind control 252 to shuttle the play-head in reverse direction. The output of information is advanced by the user selecting the forward control 254 during playback to shift forward at faster than the normal play rate, e.g. double the speed. Also provided by the processing system may be a stop control 256 for ceasing the output action and a pause control 258 for temporarily suspending the movement of the information from the system. In practice, the stop control 256 may be selected and then the rewind control 252 or forward control 254 selected to quickly skip forward or backwards through the footage.

In one method of outputting the time based information through the use of output controls, the play control 250 is activated and then the rewind control 252 or forward control 254 chosen to move to a position that is a immediately prior to the appropriate position for capture. The stop control 256 is selected and the play control 250 is reactivated. When the scene of interest is displayed or a particular portion of audio is played, the clip may be edited.

Several additional output controls may also be employed for alternative ways of communicating the information. For example, a full screen mode control 252 may be provided to permit the presentation to be shown in a window that spans the entire area of the display. Also, some control elements may adjust the quality of playback. A preferences option with a playback tab (not shown), and an edit pull down menu 254 are some optional quality controls. In addition, a sound control knob 256 functions to adjust the intensity of audio.

A smooth motion control may be present to allow the user to create a smoother playback than would be typically expected. Usually, the bandwidth necessary to display digital video requires that visual quality be compromised in order to deliver a high number of frames per second (fps) during playback. Also, a better image control may be included to provide a crisper playback and more detail from each frame displayed. Such option for a better image is often at the expense of motion quality. The number of frames per second that may be displayed is dependent on the processing power of the system, where higher power results in higher frame rate and playback that is less choppy.

Some forms of control elements that are visible on the screen are buttons, "pop-up" or pull-down menus, scroll bars and iconic images. Other control elements may be invisible to the screen and thus are not included on the GUI. There are a variety of interactive mechanisms to activate the control elements, such as keyboard input, voice command, mouse manipulation, text entry, pen-to-text data entry device, touch screen, network signals, satellite transmissions, preprogrammed triggers within the system, instructional input from other applications, etc. All of the control elements described herein are by way of example and are not intended to limit the choices that are or may become available in the art.

Other control elements are not visible on the screen but may be present on input/output devices, such as a keyboard that is in communication with the I/O control. For example, a space bar on a keyboard may also be depressed to start capture and depressed again to stop capture of the information on the fly while playing the time based information during capture mode.

The table shown below describes other control elements that may be present on the keyboard, where the items in the "action" column describe the command activated by depressing the keyboard button and the items in the "shortcut" column are the corresponding keyboard buttons.

| Keyboard shortcuts | |
|---|---|
| Action | Shortcut |
| Navigation | |
| Play/Stop and Start/Stop Capture | Space Bar |
| Play-head to Beginning of Movie | Home |
| Play-head to End of Movie | End |
| Forward One Frame | Right Arrow |
| Forward Ten Frames | Shift + Right Arrow |
| Roll Play-head Forward | Hold Down Right Arrow |
| Search Forward (fforward) | Command + ] |
| Back One Frame | Left Arrow |
| Back Ten Frames | Shift + Left Arrow |
| Roll Play-head Backward | Hold Down Left Arrow |
| Search Backward (rewind) | Command + [ |
| Selection | |
| Multiple Selection | Shift + Click Item |
| Multiple Selection (range) | Click 1st item then Shift + Click last item |
| Moving/Cropping | |
| Move Audio Clip | Click Clip + Left or Right Arrow |
| Move Audio Clip Ten Frames | Click Clip, then Shift + Left or Right Arrow |
| Move Crop Marker | Click Marker + Left or Right Arrow |
| Move Crop Marker Ten Frames | Click Marker, then Shift + Left or Right Arrow |
| Accept/Cancel | |
| Accept Dialogs (OK) | Return |
| Cancel Dialogs | Esc or Command + C |
| Cancel Rendering | Command + .(period) |
| Volume | |
| Increase System Volume | Up Arrow |
| Decrease System Volume | Down Arrow |
| Titling | |
| Move Between Text Fields | Tab |
| File Menu Functions | |
| New Project | Command + N |
| Open Project | Command + O |
| Save Project | Command + S |
| Export Movie | Command + E |
| Save Frame As | Command + F |
| Import File | Command + I |
| Quit | Command + Q |
| Edit Menu Functions | |
| Undo | Command + Z |
| Redo | Shift + Command + Z |
| Cut | Command + X |
| Copy | Command + C |
| Paste | Command + V |
| Crop | Command + K |
| Split Clip at Play-head | Command + T |
| Select All | Command + A |
| Select None | Command + D |
| Help Menu Functions | |
| iMovie Help | Command + ? or Help key |

Figure 5B:
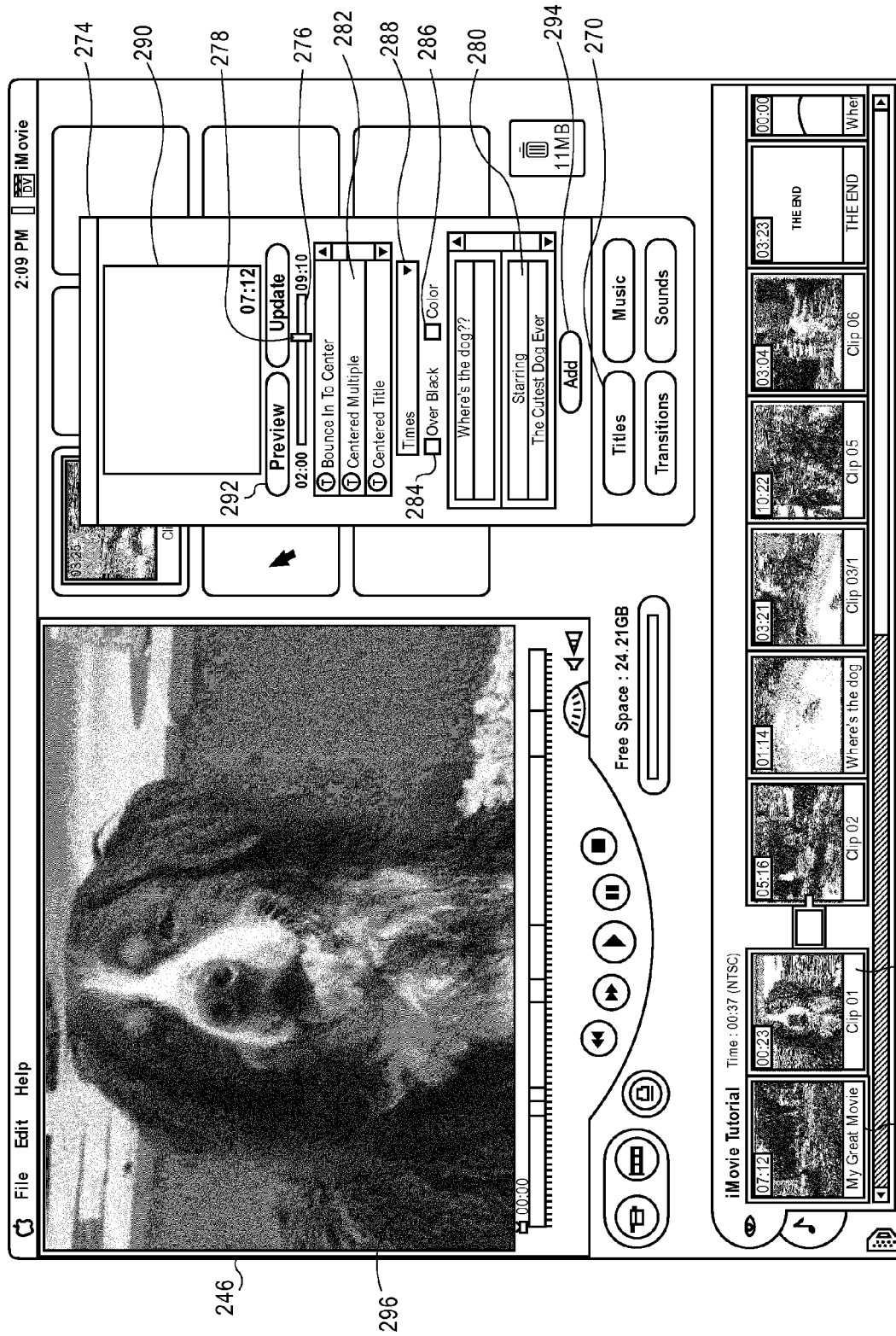
Figure 5C:
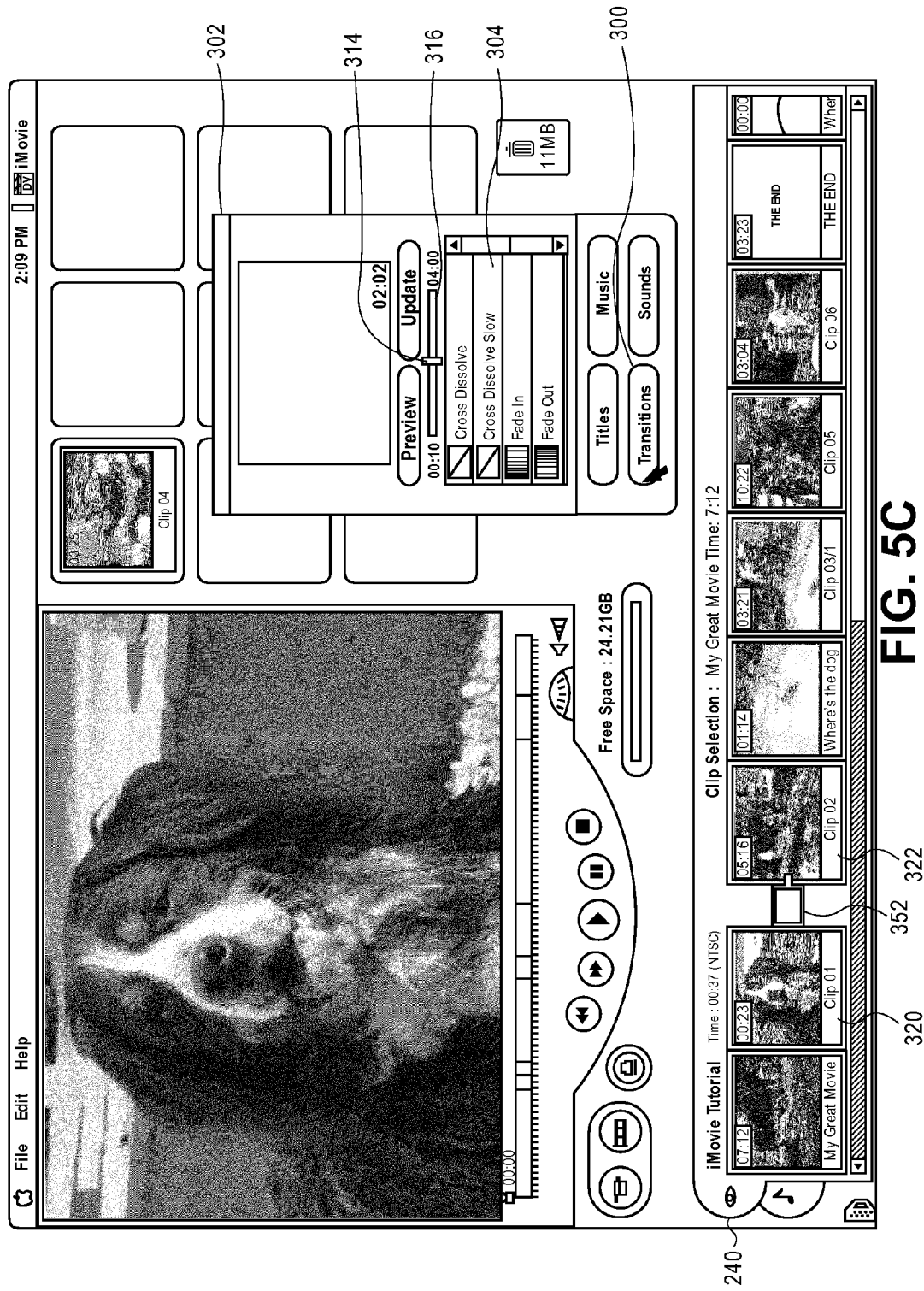

Processing control elements are useful for editing and generating the presentation shown variously in the GUI 230 in FIGS. 5A, 5B and 5C. The user may manipulate the clip representations 236 in forming segments of a presentation. In one embodiment, a representation is moved to various portions of the display by moving a cursor over the representation that may be on a shelf 238 (as shown in FIG. 5A), a video time-line 240, an audio time-line 242 or other portion of the display and dragging the representation to another portion of the display. Other functionalities may be present to relocate the representations such as mouse clicks, keyboard commands, control elements, etc.

The representation may be moved by the user to the monitor window 246 so that the clip may be viewed on the monitor window. A monitor window time line 260 depicts where the play-head 262 as it travels along the course of the clip. A variety of output controls 248 may be used to move the play-head to various positions on the clip. When the play-head is at the frame of interest, the pause control 258 may be activated and the frame edited.

Particular segments of information are aligned in the order that they will appear in the presentation. Each clip that is to be included in the presentation is positioned in the presentation by arranging the clips representation along a video time line 240 or audio time line 242.

The chosen clip may be edited by use of the edit box 268 (as shown in FIG. 5A) that includes various editing options, such as titles control 270, transitions control 300, music control 330 and sound control 350.

Title control 270 includes instructions for adding text, such as headings, labels or captions, to a clip. Selection of the title control 270 opens a title window 274 as shown in FIG. 5B. A title time line 276 shows the length of the selected clip and the position of the play-head 278. The user may navigate the play-head 278. The user may navigate the play-head to various frames in the clip by positioning a cursor over the play-head through use of a mouse, or using other cursor positioning means. The mouse may be used by clicking and holding down on it and sliding the mouse to the left or right along the title time-line relative to the desired location of the play-head. The title window 274 frequently also includes one or more text field(s) 280 for describing the desired text. A position menu 282 permits the user to choose where and how the text is to appear on the frame. For example, the text may be a centered title, appear to bounce through the length of the frame, centered with multiple text lines, centered as a title, letters flying across the frame, words flying, music video, rolling center credits, rolling credits, scroll with a pause, scrolling as a block, typewriter, and the like. A font menu 288 may be used to dictate the character type. An "over black" control 284 may be used to insert an additional black frame at the play-head position and the title over the black frame. An example of a reference element with text over black 285, having the title, "THE END" is shown on time line 240. On the other hand, a "color" control 286 may be used to overlay the text over the current frame. The text may be shown in a preview window 290 by selecting a preview control 292. Preview simulates the edited reference without the edited version being actually saved in storage. An add control 294 may be provided for storing the reference with the title. The reference with edit feature 296 may then be shown on the monitor window 246. The initial clip 01 may be split into the reference with edit feature 296 and remaining portion reference 298, as shown on video time line 240.

A transition control 300 has instructions for inserting an effect between clips, where selection of the transition control 300 opens a transition window 302, as depicted in FIG. 5C. A transition effects menu 304 permits the user to choose from any one of numerous transition options. Examples of transitions are cross dissolve, cross dissolve slow, fade in, fade out, overlap, push right, slowly push right, scale down, slowly scale down, and the like. The frame location of the play-head 314 along transition time ruler 316 may be positioned by the same or similar manner as described above for introducing titles in a clip. The transition is typically inserted as a frame immediately after the play-head position by reference element with transition 352 and then appears on visual time line 240. At the point of the inserted transition frame 352, the clip appears to split with clip 01 reference 320 representing the portion of the clip preceding the transition and clip 02 reference 322 indicating the clip immediately after the transition frame 352, as shown on video-time line 240.

Furthermore, the exemplary edit box 268 shown in FIG. 5A includes music control 330 for incorporating music tracks to the presentation where the music may be recorded by controls in the music control window. Sound control 350 in the edit box 268 is for including sound effect to portions of the presentation. Usually, the sound effects are prerecorded and stored within the processing system. Some examples of sounds are cat meow, dog bark, crickets, crowd applause, trumpets fanfare, wild laugh, water lapping, whistle, thunder, horn honk and footsteps.

The presentation, as edited, may be saved in a variety of formats, such as a QuickTime file or other formats suitable for transfer via e-mail, web pages, CD-ROM, etc. The presentation may be accessed at a later time for additional editing or may be transferred from the processing system, such as conveyed to an external player.

In addition to the features described above, the processing system may further include alternative aspects that enhance ease and convenience of use. For example, referring again to FIG. 1, the information source 80 may be controlled through the processing system 12. Source controls operate the information source 80, usually where no digital converter 82 is employed as an intermediate between the information source and processing system. The source controls may be presented on the GUI. In one embodiment, the output controls 248, as shown in FIG. 2 also serve as the source controls to direct the monitor window views at one time and send action commands to the information source 80 at another time. Thus, the source controls may include rewind control 252, forward control 254, play control 250, pause control 258 and stop control 256.

Software Overview

Figure 6:
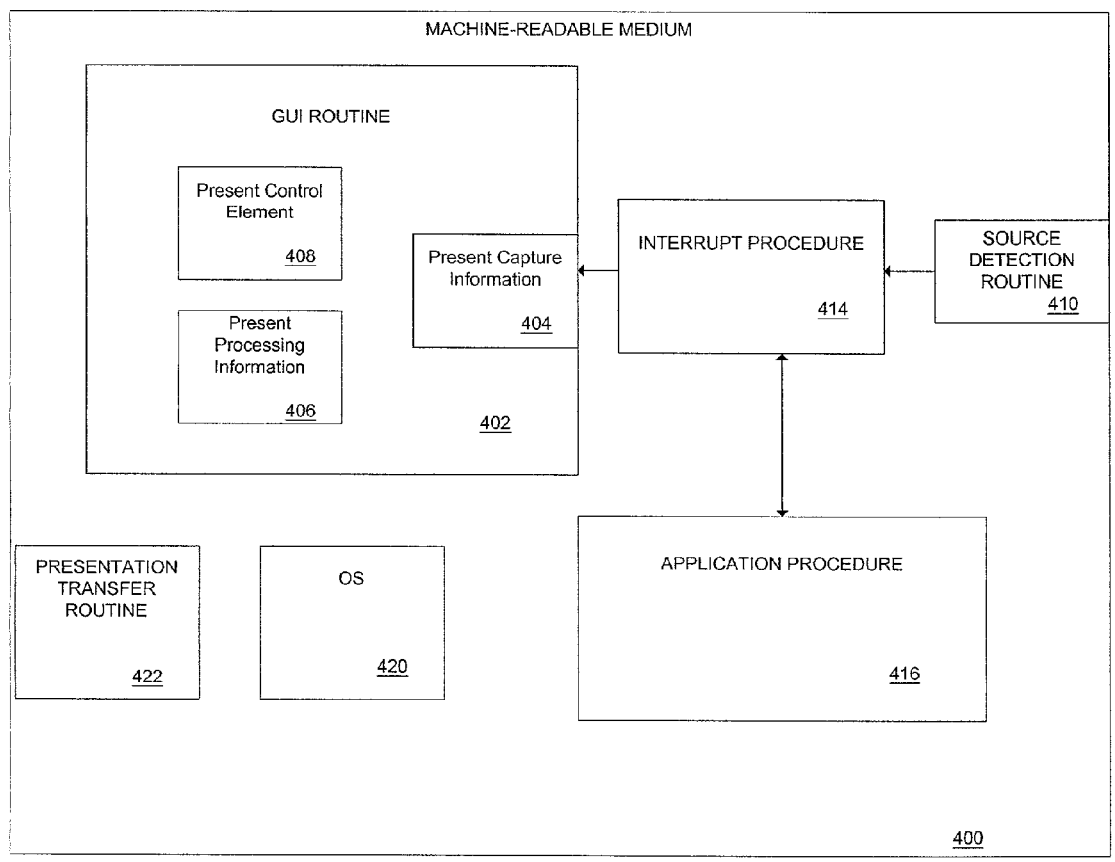
FIG. 6 is a block diagram of a machine-readable medium storing executable code and/or other data to provide one or a combination of mechanisms for processing a time based stream of information, configured in accordance with one embodiment of the present invention.

Various software components may be provided within or in communication with the system that cause the processor to execute the numerous methods employed in creating the presentation. FIG. 6 is a block diagram of a machine-readable medium storing executable code and/or other data to provide one or a combination of mechanisms for collecting and manipulating the time based stream of information, according to one embodiment of the invention. The machine-readable storage medium 400 represents one or a combination of various types of media/devices for storing machine-readable data, which may include machine-executable code or routines. As such, the machine-readable storage medium 400 could include, but is not limited to one or a combination of a magnetic storage space, magneto-optical storage, tape, optical storage, dynamic random access memory, static RAM, flash memory, etc.

The machine readable storage medium 400 is shown storing a GUI routine 402, which, when executed, provides a GUI for display of capture and process information regarding the time based stream of information, such as the GUI 230 shown in FIG. 3. The GUI routine 402 includes a number of mechanisms for playing or otherwise processing the time based stream of information. For example, a show capture information routine 404 provides capture information, including a capture output from the time based stream of information onto a portion of the display, e.g. monitor window 146, in response to information being acquired and according to control element commands, as described with reference to FIG. 3. A show process information routine 406 provides process information and show control elements 408 permits control elements to be visible on the display.

The medium also has a source detector routine 410 for conducting checks for communication with the information source. The detector routine 410 may further be configured for directing the GUI routine automatically switch the system to a capture mode and to provide capture information in response to detecting a communication with an information source. The detector routine is associated with the detector 24 as described in reference to FIG. 2.

The machine readable storage medium 400 may also store an interrupt procedure 414, as described with reference to FIG. 4B, for suspending and activating a capture procedure. An application procedure 416 may have various subroutines for processing control elements, such as for manipulating information and constructing a presentation and for executing side operations.

Other software components may include an operating system 320 and a presentation transfer routine 422 that facilitates communication of information from the processing system, such as via external player 84. Various modes of transfer are described above with reference to the external player 84 in FIG. 1.

The software components may be provided in as a series of computer readable instructions. When the instructions are executed, they cause a processor, such as through a browser to perform the capture and editing steps as described. For example, the instructions may cause a processor to communicate with an information source, provide capture information from the time based stream of information on a first portion of a display, provide process information for constructing the presentation on a second portion of the display; and provide at least one enabled control element. Such instructions may be presented to the processor by various mechanisms, such as a plug-in, ActiveX control, through use of an application service provided or a network, etc.

The present invention has been described above in varied detail by reference to particular embodiments and figures. However, these specifics should not be construed as limitations on the scope of the invention, but merely as illustrations of some of the presently preferred embodiments. It is to be further understood that other modifications or substitutions may be made to the described information transfer system as well as methods of its use without departing from the broad scope of the invention. Therefore, the following claims and their legal equivalents should determine the scope of the invention.

What is claimed is:

1. A method for collecting a time based stream of information in a processing system for generating a presentation, the method comprising:
   A) communicating with an information source having a time based stream of information;
   B) presenting capture information from the time based stream of information on a portion of a first interface on a display while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy wherein the interrupt procedure repeats at a second rate that is not less than the transfer rate 30 frames per second at which the time based stream of information arrives from the information source; and
   C) presenting on the first interface on the display at least one enabled edit-control element, which directly causes editing of the time based stream of information, the presenting of the at least one enabled edit control element being performed concurrently while presenting the capture information from the time based stream of information that is concurrently being imported into the system on the first interface.

2. The method of claim 1, further including capturing the time based stream of information from the information source and presenting process information associated with the time based stream of information that is capable of being edited for constructing an edited presentation on the first interface on the display, wherein the process information presents an edit output.

3. The method of claim 2, wherein the capturing is by an interrupt procedure.

4. The method of claim 3, wherein the interrupt procedure iterates at the same rate or substantially the same rate as the transfer rate of the time based stream of information.

5. The method of claim 1, wherein at least one of the enabled control elements is to perform side operations.

6. The method of claim 1, wherein at least one of the enabled control elements is an output control.

7. The method of claim 1, wherein the capture information includes a capture output presented at the same rate or substantially the same rate as the transfer rate for the time based stream of information.

8. The method of claim 1, further including presenting an in the first interface.

9. The method of claim 1, wherein the presenting of capture information is automatic in response to the communicating with the information source.

10. The method of claim 1, further comprising:
   receiving an input on the at least one enabled edit control element to perform the editing of the time based stream of information, wherein the receiving of the input is performed concurrently while presenting the capture information from the time based stream of information that is being concurrently imported into the system on the first interface.

11. A processing system for generating a presentation of a time based stream of information, the system comprising:
   A) a capture port for acquiring the time based stream of information;
   B) a display device; and
   C) a processor coupled to the capture port and to the display device, the processor configured to:
      i) communicate with an information source having a time based stream of information through the capture port;
      ii) present capture information from the time based stream of information on a portion of a first interface on the display device while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source; and iii) present on the first interface on the display at least one enabled edit-control element, which directly causes editing of the time based stream of information, the presenting of the at least one enabled edit control element being performed concurrently while presenting the capture information from the time based stream of information that is concurrently being imported into the system on the first interface.

12. The system of claim 11, wherein the processor is further to capture the time based stream of information from the information source and present process information associated with the time based stream of information that is capable of being edited for constructing an edited presentation on the first interface on the display device, wherein the process information presents an edit output.

13. The system of claim 12, wherein the capturing is by the processor executing an interrupt procedure.

14. The system of claim 13, wherein the interrupt procedure iterates at the same rate or substantially the same rate as the transfer rate of the time based stream of information.

15. The system of claim 11, wherein at least one of the enabled control elements is to perform side operations.

16. The system of claim 11, wherein the capture information includes a capture output presented the same rate or at substantially the same rate as the transfer rate for the time based stream of information.

17. The system of claim 11, wherein the processor is further to present an edited output in the first interface.

18. The system of claim 11, wherein the presenting of capture information is automatic in response to the communicating with the information source.

19. The system of claim 11, wherein the processor is further configured to receive an input on the at least one enabled edit control element to perform the editing of the time based stream of information, wherein the receiving of the input is performed concurrently while presenting the capture information from the time based stream of information that is being concurrently imported into the system on the first interface.

20. A processing system for collecting a time based stream of information to generate a presentation comprising:
  (i) means for communicating with an information source having a time based stream of information;
  (ii) means for presenting capture information from the time based stream of information on a portion of a first interface on the display device while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source; and
  (iii) means for presenting on the first interface on the display at least one enabled edit-control element, which directly causes editing of the time based stream of information, the presenting of the at least one enabled edit control element being performed concurrently while presenting the capture information from the time based stream of information that is concurrently being imported into the system on the first interface.

21. The system of claim 20, further including a means for capturing the time based stream of information from the information source and presenting process information associated with the time based stream of information that is capable of being edited for constructing an edited presentation on the first interface on the display, wherein the process information presents an edit output.

22. The system of claim 21, wherein the means for capturing is by executing an interrupt procedure.

23. The system of claim 22, wherein the interrupt procedure iterates at the same or substantially the same rate as the transfer rate of the time based stream of information from the information source.

24. The system of claim 20, wherein at least one of the enabled control elements is to perform side operations.

25. The system of claim 20, further including a means for presenting an edited output in the first interface.

26. The system of claim 20, wherein the presenting of capture information is automatic in response to the communicating with the information source.

27. The system of claim 20, further comprising:
  means for receiving an input on the at least one enabled edit control element to perform the editing of the time based stream of information, wherein the receiving of the input is performed concurrently while presenting the capture information from the time based stream of information that is being concurrently imported into the system on the first interface.

28. A computer readable medium having stored therein a plurality of sequences of executable instructions, which, when executed by a processing system for collecting a time based stream of information and generating a presentation, cause the processing system to:
  A) communicate with an information source having a time based stream of information;
  B) provide capture information from the time based stream of information on a portion of a first interface on a display while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source; and
  D) provide on the first interface on the display at least one enabled edit-control element, which directly causes editing of the time based stream of information, the presenting of the at least one enabled edit control element being performed concurrently while presenting the capture information from the time based stream of information that is concurrently being imported into the system on the first interface.

29. The computer readable medium of claim 28, further including additional sequences of executable instructions, which, when executed by the processing system, cause the processing system to capture the time based stream of information from the information source and to present process information associated with the time based stream of information that is capable of being edited for constructing an edited presentation on the first interface on the display, wherein the process information presents an edit output.

30. The computer readable medium of claim 29, further comprising instructions that cause the processing system to receive an input on the at least one enabled edit control element to perform the editing of the time based stream of information, wherein the receiving of the input is performed concurrently while presenting the capture information from the time based stream of information that is being concurrently imported into the system on the first interface.

31. The computer readable medium of claim 28, wherein the capturing is by an interrupt procedure.

32. The computer readable medium of claim 31, wherein the interrupt procedure iterates at the same or substantially the same rate as the transfer rate of the time based stream of information.

33. The computer readable medium of claim 28, wherein the at least one of the enabled control elements is to perform side operations.

34. The computer readable medium of claim 28, wherein the capture information includes a capture output provided at the same rate or substantially the same rate as the transfer rate for the time based stream of information.

35. The computer readable medium of claim 28, further including additional sequences of executable instructions, which, when executed by the processing system, cause the processing system to provide an edited output in the first interface.

36. The computer readable medium of claim 28, wherein the presenting of capture information is automatic in response to the communicating with the information source.

37. A method for collecting a time based stream of information in a processing system for generating a presentation, the method comprising:
A) detecting a coupling with an information source having a time based stream of information in communication with the processing system,
B) automatically presenting capture information from the time based stream of information on a display in response to the detecting while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate 30 frames per second at which the time based stream of information arrives from the information source; and
C) presenting on a first interface on the display at least one enabled edit-control element, which directly causes editing of the time based stream of information, the presenting of the at least one enabled edit control element being performed concurrently while presenting the capture information from the time based stream of information that is concurrently being imported into the system on the first interface.

38. The method of claim 37, further including automatically checking for the information source in communication with the processing system.

39. The method of claim 37, wherein the detecting is by receiving a signal from the information source through a capture port on the processing system, and wherein the automatically presenting comprises opening a window on the display.

40. The method of claim 37, further including capturing the time based stream of information from the information source.

41. A processing system for generating a presentation of a time based stream of information, the system comprising:
A) a capture port for acquiring the time based stream of information;
B) a display device; and
C) a processor coupled to the capture port and to the display device, the processor configured to:
i) detect a coupling with an information source having a time based stream of information in communication with the processing system,
ii) automatically present capture information from the time based stream of information on a display in response to the detecting while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source; and
iii) present on a first interface on the display at least one enabled edit control element, which directly causes editing of the time based stream of information, the presenting of the at least one enabled edit control element being performed concurrently while presenting the capture information from the time based stream of information that is concurrently being imported into the system on the first interface.

42. The system of claim 41, wherein the processor is further to automatically check for the information source in communication with the processing system.

43. The system of claim 41, wherein the detecting is by receiving a signal from the information source through a capture port on the processing system, and wherein the automatically presenting comprises opening a window on the display device.

44. The system of claim 41, wherein the processor is further to capture the time based stream of information from the information source.

45. A processing system for collecting a time based stream of information to generate a presentation comprising:
A) means for detecting a coupling with an information source having a time based stream of information in communication with the processing system, and
B) means for automatically presenting capture information from the time based stream of information on a display in response to detecting while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source; and (iii) means for presenting on the first interface on the display at least one enabled edit-control element, which directly causes editing of the time based stream of information, the presenting of the at least one enabled edit control element being performed concurrently while presenting the capture information from the time based stream of information that is concurrently being imported into the system on the first interface.

46. The system of claim 45, further including a means for automatically checking for the information source in communication with the processing system.

47. The system of claim 45, wherein the detecting is by receiving a signal from the information source through a capture port on the processing system, and wherein the means for automatically presenting comprises a means for opening a window on the display.

48. The system of claim 45, further including a means for capturing the time based stream of information from the information source.

49. A computer readable medium having stored therein a plurality of sequences of executable instructions, which, when executed by a processing system for collecting a time based stream of information and generating a presentation, cause the processing system to:

A) detect a coupling with an information source having a time based stream of information in communication with the processing system, B) automatically present capture information from the time based stream of information on a display in response to the detecting while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source; and C) provide on a first interface on the display at least one enabled edit control element, which directly causes editing of the time based stream of information, the presenting of the at least one enabled edit control element being performed concurrently while presenting the capture information from the time based stream of information that is concurrently being imported into the system on the first interface.

50. The computer readable medium of claim 49, further including additional sequences of executable instructions, which, when executed by the processing system, cause the processing system to automatically check for the information source in communication with the processing system.

51. The computer readable medium of claim 49, wherein the detecting is by receiving a signal from the information source through a capture port on the processing system, and wherein the automatically presenting comprises opening a window on the display.

52. The computer readable medium of claim 49, further including additional sequences of executable instructions, which, when executed by the processing system, cause the processing system to capture the time based stream of information from the information source.

53. A method for generating a presentation of a time based stream of information in a processing system, the method comprising:

A) capturing the time based stream of information from an information source into the processing system during a capture mode;

B) presenting a capture output on a viewing portion of a display during the capture mode, wherein the presenting of the capture output is performed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate 30 frames per second of the time based stream of information;

C) presenting an edit output on the viewing portion of the display during an edit mode; and D) presenting on a first interface on the display at least one enabled edit-control element, which directly causes editing of the time based stream of information, the presenting of the at least one enabled edit control element being performed concurrently while presenting the capture information from the time based stream of information that is concurrently being imported into the system on the first interface.

54. The method of claim 53, further including providing at least one enabled control element during the capture mode and edit mode.

55. The method of claim 54, wherein at least one of the enabled control element includes a control element perform side operations.

56. A processing system for generating a presentation of a time based stream of information, the system comprising:

A) a capture port for acquiring the time based stream of information;

B) a display device; and

C) a processor coupled to the capture port and coupled to the display device, the processor configured to:

i) capture the time based stream of information from an information source into the processing system during a capture mode;

ii) present a capture output on a viewing portion of a display during the capture mode, wherein the presenting of the capture output is performed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate 30 frames per second of the time based stream of information;

iii) present an edit output on the viewing portion of the display during an edit mode; and iiii) present on a first interface on the display at least one enabled edit-control element, which directly causes editing of the time based stream of information, the presenting of the at least one enabled edit control element being performed concurrently while presenting the capture information from the time based stream of information that is concurrently being imported into the system on the first interface.

57. The system of claim 56, wherein the processor is further to provide at least one enabled control element during the capture mode and edit mode.

58. The system of claim 57, wherein at least one of the enabled control element is to perform side operations.

59. A processing system for collecting a time based stream of information to generate a presentation comprising:
   A) means for capturing the time based stream of information from an information source into the processing system during a capture mode;
   B) means for presenting a capture output on a viewing portion of a display during the capture mode, wherein the means for presenting the capture output is for presenting at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate 30 frames per second of the time based stream of information; and
   C) means for presenting an edit output on the viewing portion of the display during an edit mode; and
   D) means for presenting on a first interface on the display at least one enabled edit control element, which directly causes editing of the time based stream of information, wherein the presenting of the at least one enabled edit control element being performed concurrently while presenting the capture information from the time based stream of information that is concurrently being imported into the system on the first interface.

60. The system of claim 59, further including a means for providing at least one enabled control element during the capture mode and edit mode.

61. The system of claim 60, wherein at least one of the enabled control element is to perform side operations.

62. A computer readable medium having stored therein a plurality of sequences of executable instructions, which, when executed by a processing system for collecting a time based stream of information and generating a presentation, cause the processing system to:
   A) capture the time based stream of information from an information source into the processing system during a capture mode;
   B) present a capture output on a viewing portion of a display during the capture mode, wherein the presenting of the capture output is performed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate 30 frames per second of the time based stream of information;
   C) present an edit output on the viewing portion of the display during an edit mode; and
   D) present on a first interface on the display at least one enabled edit control element, which directly causes editing of the time based stream of information, the presenting of the at least one enabled edit control element being performed concurrently while presenting the capture information from the time based stream of information that is concurrently being imported into the system on the first interface.

63. The computer readable medium of claim 62, further including additional sequences of executable instructions, which, when executed by the processing system, cause the processing system to provide at least one enabled control element during the capture mode and edit mode.

64. The computer readable medium of claim 63, wherein at least one of the enabled control element is to perform side operations.

65. A method of collecting a time based stream of information from an editing window in a processing system, the method comprising:
   A) detecting the coupling of an information source to the processing system;
   B) automatically engaging a capture mode to import the time based stream of information into the system in response to the detecting; and
   C) presenting a captured time based stream of information in the editing window that includes at least one enabled edit control element, which directly causes editing the time based stream of information, the presenting of the at least one enable control element being performed concurrently while presenting the capture information from the time based stream of information that is concurrently being acquired from the information source in the capture mode in the editing window; wherein the capture information is displayed at a first rate that is substantially the same as a transfer rate at which the time based stream of information arrives from the information source by an automatic interrupt procedure that includes copying the time based information that arrives from the information source to a proxy wherein the interrupt procedure repeats at a second rate that is not less than the transfer rate 30 frames per second at which the time based stream of information arrives from the information source.

66. The method of claim 65, wherein the editing window includes a toggle control element to switch between capture and edit mode within the editing window.

67. A processing system for collecting a time based stream of information from an editing window, the system comprising:
   A) a capture port for acquiring the time based stream of information;
   B) a display device; and
   C) a processor coupled to the capture port and coupled to the display device, the processor configured to:
      i) detect the coupling of an information source to the processing system,
      ii) automatically engage a capture mode to import the time based stream of information into the system in response to the detecting, and
      iii) present a captured time based stream of information in the editing window that includes at least one enabled edit control element, which directly causes editing the time based stream of information, the at least one enabled edit control element being presented concurrently while presenting the capture information from the time based stream of information that is concurrently being acquired from the information source in the capture mode in the editing window, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source.

68. The system of claim 67, wherein the editing window includes a toggle control element to switch between capture and edit mode within the editing window.

69. A processing system for collecting a time based stream of information from an editing window comprising:
   A) a means for detecting the coupling of an information source to the processing system;
   B) a means for automatically engaging a capture mode to import the time based stream of information into the system in response to the detecting; and
   C) a means for presenting a captured time based stream of information in the editing window that includes at least one enabled edit control element, which directly causes editing the time based stream of information, the presenting of the at least one enabled edit control element being performed concurrently while presenting the capture information from the time based stream of information that is concurrently being acquired from the information source in the capture mode in the editing window, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source.

70. The system of claim 69, wherein the editing window includes a toggle control element to switch between capture and edit mode within the editing window.

71. A computer readable medium having stored therein a plurality of sequences of executable instructions, which, when executed by a processing system for collecting a time based stream of information and generating a presentation, cause the processing system to:
   A) detect the coupling of an information source to the processing system;
   B) automatically engage a capture mode to import the time based stream of information into the system in response to the detecting; and
   C) present a captured time based stream of information in the editing window that includes at least one enabled edit control element, which directly causes editing the time based stream of information, the presenting of the at least one enabled edit control element being performed concurrently while presenting the capture information from the time based stream of information that is concurrently being acquired from the information source in the capture mode in the editing window, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source.

72. The computer readable medium of claim 71, wherein the automatically engage is in response to the detect.

73. The computer readable medium of claim 71, wherein the editing window includes a toggle control element to switch between capture and edit mode within the editing window.

74. A method for collecting a time based stream of information in a processing system for generating a presentation, the method comprising:
   A) communicating with an information source having a time based stream of information;
   B) presenting a capture information from the time based stream of information on a portion of a display while the capture information is acquired from the information source in a capture mode, the capture mode to import the time based stream of information into the system, wherein the capture information is displayed at a first rate that is substantially the same as a transfer rate at which the time based stream of information arrives from the information source by an automatic interrupt procedure that includes copying the time based information that arrives from the information source to a proxy, wherein the interrupt procedure repeats at a second rate that is not less than the transfer rate of 30 frames per second at which the time based stream of information arrives from the information source;
   C) presenting a process information associated with the time based information that is to be edited for constructing the presentation on the display; and
   D) presenting at least one enabled edit-control element on the display that directly causes editing of the information, the presenting of the at least one enabled edit control element being performed concurrently while the time based stream of information is imported into the system and displayed as the capture information, wherein the capture information, the process information, and the at least one enabled edit control element are displayed concurrently in a single interface window.

* * * * *